Nov. 14, 1961  O. H. BANKER  3,008,335
HYDRAULIC GOVERNORS

Filed March 3, 1958  3 Sheets-Sheet 2

INVENTOR:
OSCAR H. BANKER
BY
Charles F. Vuztech
ATT'Y

Nov. 14, 1961 O. H. BANKER 3,008,335
HYDRAULIC GOVERNORS

Filed March 3, 1958 3 Sheets-Sheet 3

INVENTOR:
OSCAR H. BANKER
BY
Charles J. Vajtech
ATT'Y

3,008,335
Patented Nov. 14, 1961

3,008,335
HYDRAULIC GOVERNORS
Oscar H. Banker, Evanston, Ill., assignor, by mesne assignments, to Fawick Corporation, Cleveland, Ohio, a corporation of Michigan
Filed Mar. 3, 1958, Ser. No. 718,645
3 Claims. (Cl. 73—541)

This invention relates to hydraulic governors and it will be described with particular reference to its application as a pitch control for the propeller of an aircraft or the like.

Most of the propellers now used on aircraft are equipped with means for varying the pitch of the propeller blades to provide a more constant load on the engine, and also to permit a propeller to be feathered, that is, to have its blades turned edgewise to the direction of motion of the plane, in the event the engine for that propeller is not functioning while the aircraft is in flight. In addition, for any throttle setting of an engine, and for any given pitch setting of a propeller driven by that engine, the load on the engine may vary depending upon variations in air currents encountered by the aircraft in flight.

It is desirable for any given throttle setting of an aircraft engine to have the output shaft of that engine rotate at a constant speed. To achieve such constant engine speed under variable load conditions encountered by variable air currents it is necessary to change the pitch of the propeller to compensate for these variable air currents so that the load on the engine will be constant. Similar problems may arise in other propeller-driven craft whether air borne or water borne.

Hydraulic governors for aircraft propellers for achieving the foregoing desired results have been devised. Such governors operate on engine oil pressurized by a separate pump incorporated in the governor housing. The output of the pump is controlled by a governor driven from the same source as the pump and the pressurized fluid is conducted by suitable passages in the governor and engine to the piston which controls the pitch of the aircraft propeller driven by the output shaft of that engine. Such prior governor devices are contained in a separate housing bolted to a pad on the engine block especially prepared to receive the governor housing, with gear means on the governor meshing with gear means driven by the engine shaft so that the governor is always driven in timed relation to the engine shaft.

It is necessary from time to time, however, to adjust a propeller governor to the operating characteristics of the engine on which the governor is mounted so that for a given angular movement of the control element of the governor the required variation in propeller pitch will be effected to result in the specific range of speeds over which the engine is to be operated. In prior devices, two adjustments were possible, a major adjustment requiring a disassembly and reorientation of the control element and a minor adjustment in the nature of a fine screw, operating upon the said control element. The major adjustment could be effected only by stopping the engine, making an estimated adjustment, restarting the engine and operating it under the adjusted setting of the governor to determine whether such new setting was correct. If the setting was not correct, the engine had again to be stopped, the governor reset, and the engine again operated to determine whether the second setting was correct.

A much more satisfactory construction of governor would be one wherein all adjustments in governor setting could be made while the governor was in operation, and it is accordingly among the principal objects of this invention to provide an improved adjusting means for a hydraulic governor for a propeller or the like in which major as well as minor adjustments of the effect produced by the governor on the governed mechanism may be made while the governor is in operation.

The drive gear of the engine from which the governor is driven may run in one direction in one engine and in the opposite direction in another engine, although the engine pad to which the governor is bolted and the governor itself may otherwise be identical. In governors heretofore available, the inlet and outlet passages for the governor pump could be reversed by reversing certain plugs so that the ultimate flow of hydraulic fluid through the governor and thence to the controlled propeller was in the right direction. The presence of the plugs, however, introduced an additional element, or possibility, of error in the installation of the governor on the engine and provided an additional item to be checked before an installation could be said to be correct.

Another object of this invention is the provision of a pump equipped hydraulic governor for a variable pitch propeller wherein the direction of drive of the governor is immaterial to the proper functioning thereof to control the variable pitch propeller.

To secure better control over an aircraft engine and its propeller, it is desirable to be able to vary the speed of the engine over as wide a range as possible. In governors for aircraft propellers as heretofore constructed the difference in speed between the highest and lowest possible settings was approximately 900 r.p.m. whereas the desirable difference is approximately double this figure.

It is a further object of this invention therefore to provide an adjustable governor for an aircraft propeller or the like wherein a much greater range of speed settings for the propeller shaft is provided than has heretofore been available.

Among the more specific objects of this invention are the provisions of a simpler and more rugged adjusting spring for a hydraulic governor, improved and more stable support for the manually operated control for the governor, and an improved means for transferring the resisting spring pressure to the rotating governor weights.

These and other objects of this invention will become apparent from the following detailed description when taken together with the accompanying drawings in which, FIG. 1 is a cross section through a governor unit constructed in accordance with this invention, the view being taken along line 1—1 of FIG. 2;

Inasmuch as the governor of this invention is designed to be interchangeable with governors already in existence, the details of construction of the engine to which the governor is to be applied and of the propeller pitch control mechanism to be operated by the governor will be omitted.

Figure 1:
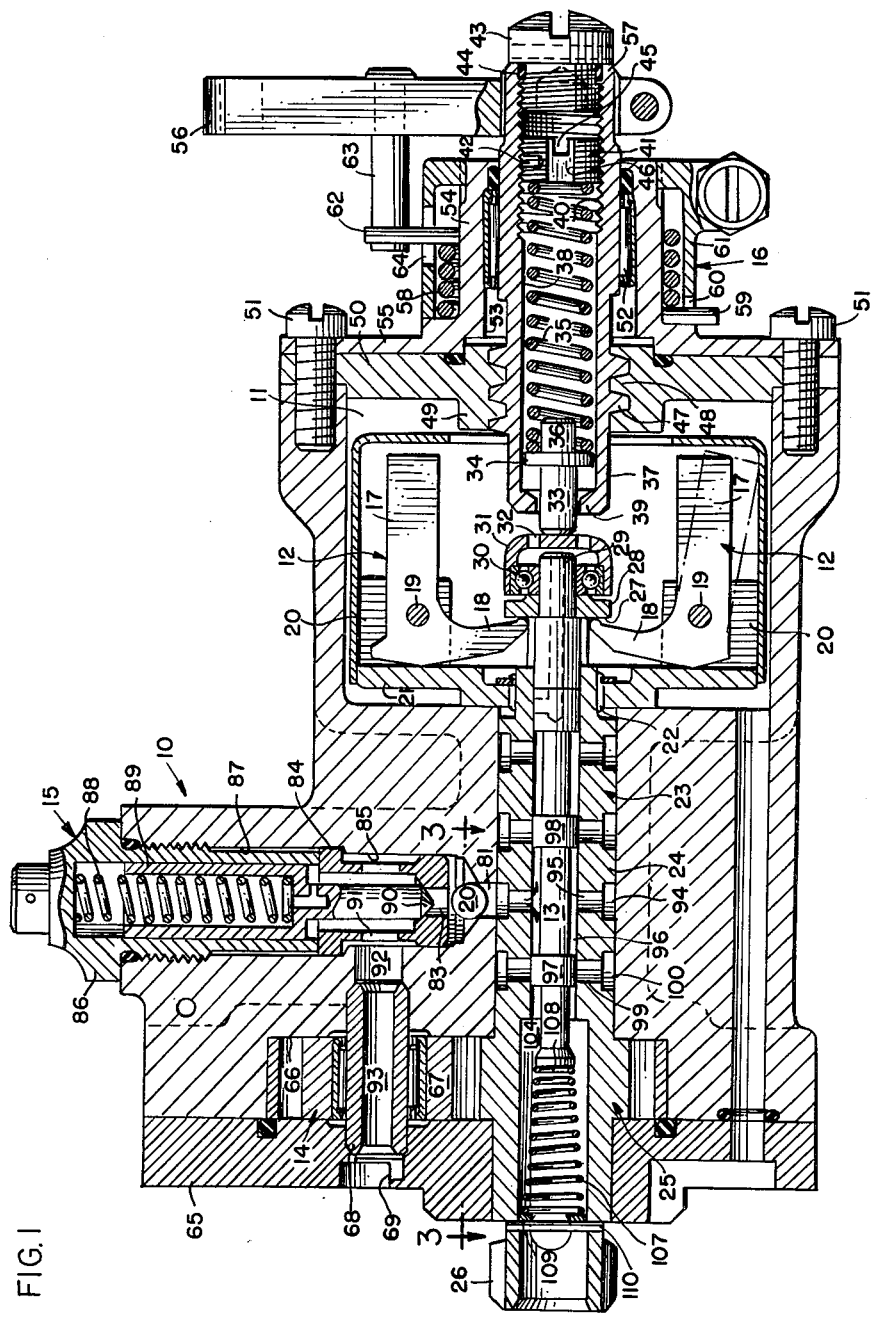

Referring now to FIG. 1, the governor is comprised of a housing 10 having a cavity 11 in which are located the governor weights 12; a valve 13 controlled by the governor weights 12 and adapted to direct fluid under pressure to the propeller (not shown), a gear type pump 14 which supplies the fluid under pressure to be controlled by the governor, and to be used thereafter to operate the propeller pitch control mechanism, a relief valve 15, which controls the pressure of the fluid coming from pump 14, and a governor control mechanism 16.

Governor weights 12 are generally L shaped, having a weight 17 extending axially, a radially inwardly extending arm 18, and a pivot 19 supported between spaced ears 20 on a governor drive plate 21 splined at 22 to a drive shaft 23 so as to be rotatable therewith. Said drive shaft extends to the left of plate 21 as viewed in FIG. 1 and includes a ported section 24, a drive pump gear 25 and a shaft drive gear 26, constructed to mesh with a gear on the engine to which the governor is to be applied and which is not shown in the drawings, said engine gear being rotated in timed relation with the propeller to be controlled by the governor.

The radially inner ends of governor arms 18 bear against the side 27 of a disc 28 which is preferably press-fitted upon the reduced end 29 of valve 13, said disc 28 in turn abutting against the inner race of an anti-friction bearing 30 which is likewise press-fitted upon said reduced end of valve 13. The outer race of anti-friction bearing 30 is press-fitted into a cup 31 extending radially inwardly across the end 29 of valve 13 and provided with openings 32 to assist in venting certain of the parts controlled by valve 13 and also promote the flow of lubricant to the anti-friction bearing 30.

Cup 31 is urged to the left, as viewed in FIG. 1, by a plunger 33 having a shoulder 34 spaced from its right-hand end, as viewed in FIG. 1, against which one end of an adjusting spring 35 of helical form constantly bears. The right-hand end 36 of plunger 33 extends into spring 35 and serves to center the latter on the plunger.

Plunger 33 and spring 35 are retained in a control worm sleeve 37 which has a bore 38 terminating in an inwardly extending flange 39 fitting loosely over plunger 33 and serving to lend some support thereto to prevent the plunger from cocking relative to the axis of rotation of cup 31. The right-hand portion of bore 38 as viewed in FIG. 1 is threaded as at 40 to receive an adjusting screw 41 against which the right-hand end of spring 35 (FIG. 1) bears.

It may be apparent that spring 35 is the return spring for governor weights 17 against which said weights must act and which the weights must overcome if they are to move radially outwardly and cause a movement of valve 13 to the right as viewed in FIG. 1 to direct fluid under pressure through the ported section 24 of shaft 22. By advancing adjusting screw 41 along threads 40, that is, by advancing the screw to the left as viewed in FIG. 1, spring 35 is placed under greater compression and therefore interposes greater resistance to the outward movement of the governor weights 17 under the influence of centrifugal force. It is also apparent that since cup 31 may remain stationary while valve 13 and shaft 22 rotate, it follows that plunger 33 may likewise remain stationary and hence the compression of spring 35 may readily be adjusted even though governor weights 17 are rotating at the time the adjustment is made. This means, therefore, that when the governor is installed on an engine and connected to the propeller the pitch of which is to be adjusted or controlled thereby, the engine and propeller may both be rotating while the governor weights 17 are being adjusted so that the effect of any adjustment in the compression of spring 35, and therefore in the force required to cause weights 17 to move outwardly under centrifugal force, will be immediately apparent.

To render adjusting screw 41 relatively insensitive to small turning moments that might be transmitted thereto through spring 35, plunger 33, and cup 31, a known means for producing a locking effect upon the threads of said screw may be employed. Thus, a small recess 42 may be formed in the side of screw 41 and the threads adjacent said recess brought slightly together by suitable axial pressure to deform them and thereby provide the slight interference required to resist the aforesaid turning moments. Screw 41 may be protected from the exterior by a plug 43 threaded into the threaded portion 40 of bore 38 and sealed with respect thereto by an O-ring or other suitable packing 44. A screw driver slot 45 in the free end of screw 41 facilitates adjustment of the screw from the exterior of bore 38, and an axial slot 46 permits escape of any fluid or gas which may be trapped between adjusting screw 41 and plug 43 when the latter is being advanced in the bore after adjusting screw 41 is fixed in place.

Control worm sleeve 37 has formed on the exterior thereof a relatively coarse thread 47 which engages an internal thread 48 formed in the hub 49 of a cover plate 50 secured to housing 10 by a plurality of machine screws 51. Control worm sleeve 37 extends outwardly to the right (as viewed in FIG. 1) from hub 49, and suitable support for the overhanging end of sleeve 37 is provided by a needle bearing 52 pressed into a bore 53 in an axially extending sleeve 54 on a bearing plate 55 piloted on cover plate 50 and secured thereto by the same machine screws 51.

Control worm sleeve 37 may be turned through an angle of approximately 100 degrees by a control arm 56 splined and clamped to the free end 57 of the sleeve 37 so as to be rotatable therewith. As in prior constructions, control arm 56 is urged continuously in one direction of rotation by a torsion spring 58, one end 59 of which extends through an opening 60 in an enclosing guard 61 for spring 58, and the other end 62 of which bears against a pin 63 secured to control arm 56. Said end 62 protrudes through a circumferential slot 64 in guard 61. The manner of adjusting the position of the slot 64 relative to the desired angular travel of arm 56 is identical with that provided in prior devices and hence will not be described herein in detail.

Figure 2:
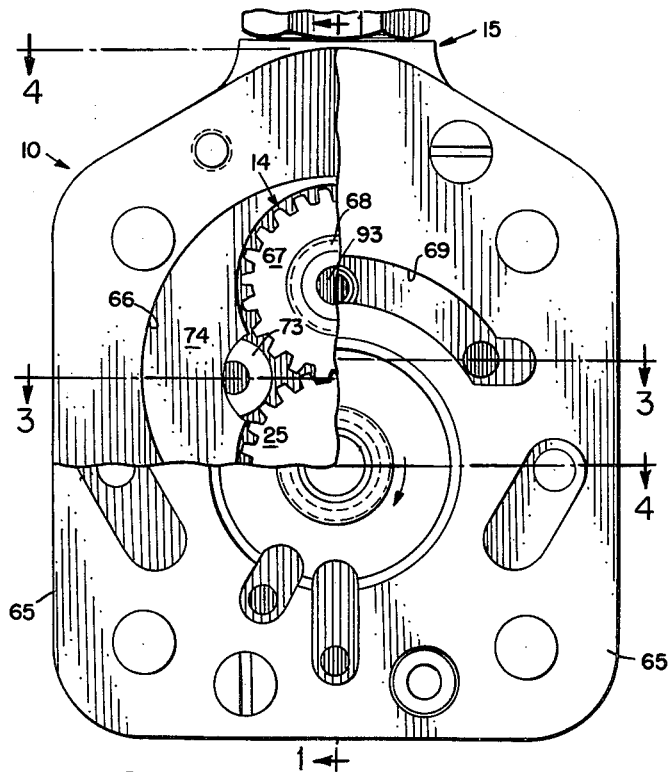
FIG. 2 is an end elevation of the governor unit of FIG. 1 looking from left to right in FIG. 1, with a portion of the end cover removed to show the pump.
Figure 3:
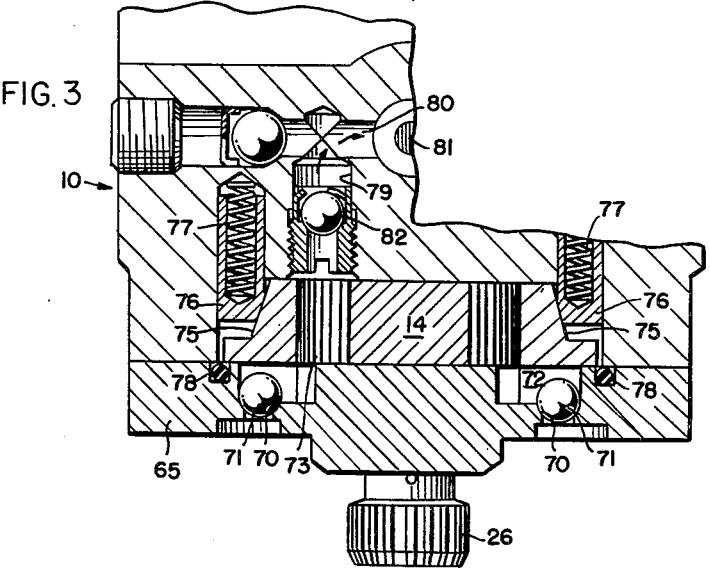
FIG. 3 is a fragmentary plan view in section of the governor unit of FIG. 1, the section being taken along line 3—3 of FIG. 2.
Figure 4:
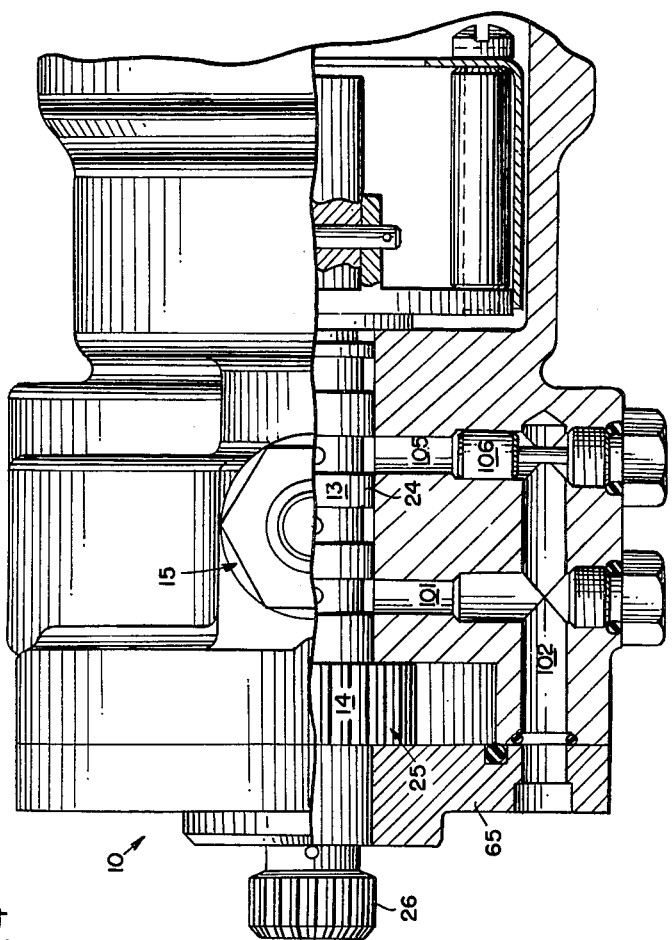
FIG. 4 is a further fragmentary plan view of the governor unit of FIG. 1, the view being partly in section and taken along line 4—4 of FIG. 2.

Referring now to FIGS. 2, 3 and 4 for a description of the hydraulic circuits through the pump and governor control valve 13, housing 10 is provided with a cover plate 65 which defines, with a recess 66 in the valve housing 10, a pump cavity in which are rotatably mounted the pump drive gear 25 previously described as being formed integrally with shaft 22, and the driven pump gear 67 meshing therewith and mounted through anti-friction bearings on a pin 68 (FIG. 1) pressed into aligned recesses in the housing and coverplate. As stated above, it is a feature of this invention that pump 14 is independent of the direction of rotation of shaft drive gear 26 and accordingly, the inlet and outlet portions of the pump are identical but are provided with suitable check valves so that fluid will always flow through the pump from the engine to the valve 13 and then out as directed by the said valve to the pitch controlling mechanism on the propeller. Thus the pump and the associated inlet and outlet passages are made symmetrical about a plane passing vertically through the axis of valve 13 as viewed in FIG. 2, and to avoid duplication of description, only one intake and one outlet passage will be described. The other intake and outlet passages are shown in dotted outline at the location they would occupy were the section 3—3 taken through the said other passages.

Coverplate 65 is formed with an arcuate slot 69 which fits over a pump intake port (not shown) on the engine block pad from which oil at 50 pounds per square inch from the engine lubrication system is supplied to the governor and the pitch changing mechanism controlled thereby. Said arcuate groove 69 connects with an intake opening 70 in coverplate 65, said opening being closed by a ball check valve 71 when the pressure is greater on the pump side of the coverplate than on the engine side. From ball check valve 71 the fluid is conducted through suitable openings 72 in the coverplate 65 to the pump inlet chamber. Said chamber is identical in form with the outlet chamber for the pump which is shown in elevation in FIG. 2 at 73. Said output chamber 73 is defined in part by gears 25 and 67, and in part by a shroud 74 which is preferably slightly deformable and which encircles the gears 25 and 67 except for the inlet and outlet chambers of the pump. At least a portion 75 of the periphery of shroud 74 is tapered and engaged by a wedge 76 biased by a spring 77 in such engaging direction, said wedge producing a radially inwardly directed force upon the shroud 74 to assist in maintaining sealing contact between the tips of the teeth of gears 25 and 67 and the shroud. A seal 78, preferably of the O-ring type, serves to seal the pump with respect to coverplate 65 and its juncture with housing 10.

The outlet chamber 73 communicates with a recess 79 in housing 10 extending in a direction parallel with the axis of rotation of shaft 24 and intersecting a passageway 80 leading to a vertical bore 81 which constitutes the inlet passage for rotating shaft 24 and its valve 13 (FIGS. 1 and 3). Within bore 79 is a ball check valve 82 which is designed to open passage 79 to cross bore 80 when the pressure in pump chamber 73 exceeds that in recess 79 but closes crossbore 80 to the chamber 73 when the relative pressures are reversed, that is, when chamber 73 functions as an inlet chamber for the pump, and is therefore at a reduced pressure with respect to crossbore 80.

It may be observed from FIG. 1 that relief valve 15 is exposed to the pressure in vertical bore 81 since the latter communicates with a bore 83 in a sleeve 84 press-fitted into relief valve recess 85. A sleeve plug 86 is threaded into a slightly enlarged portion 87 of relief valve bore 85. Within plug 86 is a spring 88 bearing against a valve 89 having a nose 90 which closes off bore 83. When the fluid pressure in bore 83 exceeds the pressure of spring 88, valve 89 rises and the fluid then passes through bore 83 around nose 90, through suitable crossbores 91 in sleeve 84 and into a bore 92 communicating with a through bore 93 in pump driven gear pin 68, and then into the arcuate slot 69 communicating with the inlet of the pump.

It may be readily apparent that because of the arrangement of check valves 71 and 82 which are duplicated for the inlet and outlet chambers of pump 14, the operation of the pump at an appropriate speed will produce a reduced pressure in one of the chambers and an increased pressure in the other which in turn causes the check valves 71 and 82 to arrange themselves accordingly either to admit fluid into, or block the flow of fluid from, the chambers but with the flow of engine oil always from intake slot 69 to crossbore 80. Pump 14 therefore is independent of the direction of rotation of the input gear 26, and hence the governor 12 and its control mechanism 16 are likewise independent of direction of rotation. The entire device thus can be installed with a minimum of preparation and without fear of a malfunction of the governor attributable to this possible source of difficulty.

Oil in vertical bore 81 is conducted inwardly to an annular collector groove 94 in the exterior surface of shaft 24 and then through crossbores 95 to the annular space 96 defined by the lands 97 and 98 on valve 13. If the governor is on speed as shown in FIG. 1, then the oil under pressure simply remains in annular space 96, but if it is under speed then valve 13 will be moved to the left as viewed in FIG. 1 to admit the oil under pressure to crossbores 99, groove 100 and thence through passages 101 (FIG. 4) and 102 to the propeller control line. If it is over speed, that is, with lands 97 and 98 moved to the right (FIG. 1) of their respective crossbores, then the propeller pitch control line 102 is vented through passages 101, groove 100, crossbores 99, and around the left-hand end of valve 13 into space 104 and back to the oil reservoir for the oil pressure line. As shown in FIG. 4, the oil under pressure on an over speed condition also passes into a passageway 105 but it is blocked there by a plug 106.

The specific manner in which the oil under pressure from the governor is utilized to control the pitch of a propeller is not material to this invention and hence will not be described herein in detail. Suffice it to say that in some propellers oil under pressure is used to decrease the pitch of the propeller whereas in other propellers the oil under pressure is used to increase the propeller pitch. Accordingly, the governors to be used with the propellers are all constructed alike, but are provided with suitable bores communicating with the various lands on the valve 13 with means such as the aforesaid plug 106 to close off those bores which are to be rendered ineffective, depending upon the type of propeller pitch control to be used with the governor.

A return spring 107 is provided in compression between the end 108 of valve 13 and an abutment comprising a washer 109 held by a pin 110 against axial movement to make certain that valve 13 is at all times abutting on the end of plunger 33. Said spring 107, however, is weaker than spring 135 and is readily compressed by the latter.

When the engine is dead and it is desired to feather the propeller control by the above-described governor, the control arm 56 is moved through a first fraction of its total arc of movement, which turns sleeve worm 37 in threads 48 in a manner to move the sleeve to the right as viewed in FIG. 1, thereby allowing spring 35 to expand until the shoulder 34 of plunger 33 abuts on the inwardly extending flange 39 on the said control worm sleeve 37. During the remainder of the arcuate travel of the arm 56, the entire sleeve 37, together with the plunger 33 are moved to the right as viewed in FIG. 1 away from cup 31, but because of the pressure of the return spring 107, valve 13 is caused to follow plunger 33 and to assume a position wherein oil under pressure is conducted to the pitch control mechanism to move it to its maximum over speed position, which is the feathering position wherein the edges and general plane of the propeller blades head into the wind to present the least drag to the movement of the propeller through the air. This desirable operation of the pitch control mechanism for a propeller having a dead engine is the direct result of the "captive" mounting of spring 35. This "captive" construction permits cup 31 to be relieved entirely of the pressure of spring 35 during the feathering action, whereas in prior constructions the left-hand end of spring 35 was constantly in contact with, and supported by, cup 31 even during the feathering operation.

The continual pressure of spring 35 on cup 31 in prior constructions tended to hold the governor weights 17 in their radial inward position at relatively high speeds, that is, the governor weights had to be rotated at all times at a high enough speed to overcome the pressure of spring 35, and hence the minimum speed possible under these conditions was considerably higher than the minimum speed permissible when spring 35 is captive. It may be readily apparent that when control worm sleeve 37 is backed away from cup 31 sufficiently far to bottom shoulder 34 of plunger 33 on flange 39, and is then moved further to the right far enough to relieve cup 31 of all pressure, the restraining force to be overcome by governor weights 17 is substantially zero and hence a lower speed of the governor weights and of the engine driving the weights for a given propeller pitch is possible. The net result is that, whereas with the prior construction the spread between the high and low engine speed is only about 800 to 900 r.p.m., with a captive spring the difference or spread is in the region of 1600 to 1800 r.p.m.

It is understood that the foregoing description is merely illustrative of a preferred embodiment of the invention and that the scope of the invention is not to be limited thereto but is to be determined by the appended claims.

I claim:

1. A governor mechanism comprising a governor body having a chamber formed in one end thereof, a control element movable in said body and extending into said chamber, speed responsive means in said chamber and connected to the control element to move said element in one direction as a function of the speed of said speed responsive means, resilient means connected to said element to urge said element in the opposite direction, a sleeve surrounding said resilient means, a cover plate closing the chamber and having an opening therein through which the sleeve extends, a threaded connection between the sleeve and plate for moving said sleeve axially relative to the plate by relative rotations therebetween, a bearing for the sleeve spaced from said threaded connection, said bearing being secured to the plate, a manually movable abutment in the sleeve for varying the initial compression of the resilient means, and manually movable means for oscillating the sleeve relative to the plate to vary the compression of the resilient means during operation of the governor, said bearing comprising a bearing plate overlying the cover plate, common fastening means for securing the bearing plate to said cover plate and said cover plate to said governor body, a second sleeve extending axially outwardly from said bearing plate and said threaded connection and concentric with and radially outwardly spaced from said first-mentioned sleeve, and anti-friction means interposed in said space between the said sleeves and supporting the first-mentioned sleeve from the second sleeve.

2. A governor mechanism according to claim 1, said manually movable means for oscillating the sleeve being mounted on the end of said sleeve remote from the plate, and torsion spring means disposed around said bearing and connected to said sleeve oscillating means for urging said oscillating means in one direction.

3. A governor mechanism according to claim 2, a cover for the torsion spring means non-rotatably secured to said bearing and having an opening therein to receive and anchor one end of said torsion spring means and a second opening therein through which the other end of said torsion spring means extends, said means for oscillating the sleeve including an abutment contacting the said other end of said torsion spring means.

References Cited in the file of this patent

UNITED STATES PATENTS

| | | |
|---|---|---|
| 164,147 | Conver | June 8, 1875 |
| 1,041,643 | Link | Oct. 15, 1912 |
| 1,567,101 | Bailey | Dec. 29, 1925 |
| 2,204,639 | Woodward | June 18, 1940 |
| 2,292,194 | Blymyer | Aug. 4, 1942 |
| 2,324,515 | Kalin | July 20, 1943 |
| 2,504,230 | Smith | Apr. 18, 1950 |
| 2,570,287 | Taylor | Oct. 9, 1951 |
| 2,667,345 | Dale | Jan. 26, 1954 |
| 2,669,983 | Reddy et al. | Feb. 23, 1954 |
| 2,697,987 | Barclay | Dec. 28, 1954 |
| 2,855,854 | Aspelin | Oct. 14, 1958 |